US011938601B2

(12) United States Patent
Fu

(10) Patent No.: US 11,938,601 B2
(45) Date of Patent: Mar. 26, 2024

(54) LOCKING PLIERS WITH ONE-HAND ADJUSTMENT

(71) Applicant: APEX BRANDS, INC., Apex, NC (US)

(72) Inventor: Zhihong Fu, Cary, NC (US)

(73) Assignee: Apex Brands, Inc., Apex, NC (US)

(*) Notice: Subject to any disclaimer, the term of this patent is extended or adjusted under 35 U.S.C. 154(b) by 266 days.

(21) Appl. No.: 17/496,389

(22) Filed: Oct. 7, 2021

(65) Prior Publication Data

US 2022/0105608 A1 Apr. 7, 2022

Related U.S. Application Data

(60) Provisional application No. 63/088,801, filed on Oct. 7, 2020.

(51) Int. Cl.
*B25B 7/14* (2006.01)
*B25B 7/12* (2006.01)

(52) U.S. Cl.
CPC . *B25B 7/14* (2013.01); *B25B 7/12* (2013.01)

(58) Field of Classification Search
CPC .................................... B25B 7/12; B25B 7/14
USPC .................................................... 81/367–380
See application file for complete search history.

(56) References Cited

U.S. PATENT DOCUMENTS

| | | | | |
|---|---|---|---|---|
| 2,388,580 A * | 11/1945 | Snell | B25B 7/123 | 81/402 |
| 2,478,728 A * | 8/1949 | Ward | B25B 7/123 | 81/367 |
| 2,523,385 A * | 9/1950 | Mead | B25B 7/123 | 81/370 |
| 3,600,986 A * | 8/1971 | Baldwin | B25B 7/123 | 81/319 |
| 6,408,724 B1 * | 6/2002 | Whiteford | B25B 7/123 | 81/367 |
| 6,776,072 B2 * | 8/2004 | Poole | B25B 7/123 | 81/370 |

* cited by examiner

*Primary Examiner* — Hadi Shakeri
(74) *Attorney, Agent, or Firm* — Burr & Forman LLP

(57) ABSTRACT

A hand tool includes a handle assembly, a jaw assembly, a clamping assembly, and an adjustment assembly. The handle assembly includes a first handle and a second handle that each include a proximal end and a distal end. The jaw assembly includes a first jaw and a second jaw. The jaw assembly is operably coupled to the proximal end of the first and second handles. The clamping assembly may be configured to enable the first and second jaws to be locked at a selected distance from each other in a locked position. The adjustment assembly may be configured to enable the selected distance to be modified. The adjustment assembly may be disposed between the first and second handles.

16 Claims, 5 Drawing Sheets

LOCKING PLIERS WITH ONE-HAND ADJUSTMENT

TECHNICAL FIELD

Example embodiments generally relate to hand tools and, in particular, relate to a locking pliers that can be adjusted with one hand.

BACKGROUND

Hand tools are commonly used across all aspects of industry and in the homes of consumers. Hand tools are employed for multiple applications including, for example, tightening, component joining, and/or the like. For some applications, a locking pliers may be preferred. These familiar hand tools typically include jaws that can be locked into position after passing an over-center or other balance or tipping point position. In this regard, the jaws can effectively be locked in a clamping position and will remain closed in the clamping position after being locked until some unlocking action or force is initiated.

Modern conventional locking pliers often include an adjustment assembly, which enables the distance between the top and bottom jaws when the pliers is locked to be adjusted. The adjustment is conventionally made via a screw that is located at a distal end of the top handle (relative to the jaws). In this regard, the adjusting screw extends out of the distal end of the top handle and must be adjusted either when no gripping action is taking place or, if during a gripping action, by the hand opposite the hand engaging the locking pliers for the gripping action. Since it is not uncommon for users to attempt to size the distance between jaws dynamically while preparing to engage in a gripping operation, using two hands to adjust the locking pliers effectively becomes almost a rule.

In addition to being more complicated, two-hand operation of the locking pliers may be impractical for certain operations (e.g., where the operator needs to hold another piece of equipment or a pipe or component that is to be gripped with the locking pliers). Thus, it may be desirable to provide a structure for a locking pliers that enables one-hand adjustment.

BRIEF SUMMARY OF SOME EXAMPLES

In an example embodiment, a hand tool may be provided. The hand tool includes a handle assembly, a jaw assembly, a clamping assembly, and an adjustment assembly. The handle assembly includes a first handle and a second handle that each include a proximal end and a distal end. The jaw assembly includes a first jaw and a second jaw. The jaw assembly is operably coupled to the proximal end of the first and second handles. The clamping assembly may be configured to enable the first and second jaws to be locked at a selected distance from each other in a locked position. The adjustment assembly may be configured to enable the selected distance to be modified. The adjustment assembly may be disposed between the first and second handles.

In another example embodiment, an adjustment assembly for adjusting an adjustable locking pliers having a handle assembly and a jaw assembly may be provided. The adjustment assembly may include an adjuster disposed between a top handle and a bottom handle of the handle assembly, a threaded receiver, and a cam lock. The adjuster may be configured to interface with the threaded receiver to enable extending or shortening an exposed length of the adjuster based on an amount of the adjuster that is received in the threaded receiver. The adjuster may be further configured to interface with a portion of the bottom handle of the handle assembly to define a selected distance between a top jaw and a bottom jaw of the jaw assembly when the locking pliers are in a locked position where a bite size between the jaws is determined based on the exposed length of the adjuster.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
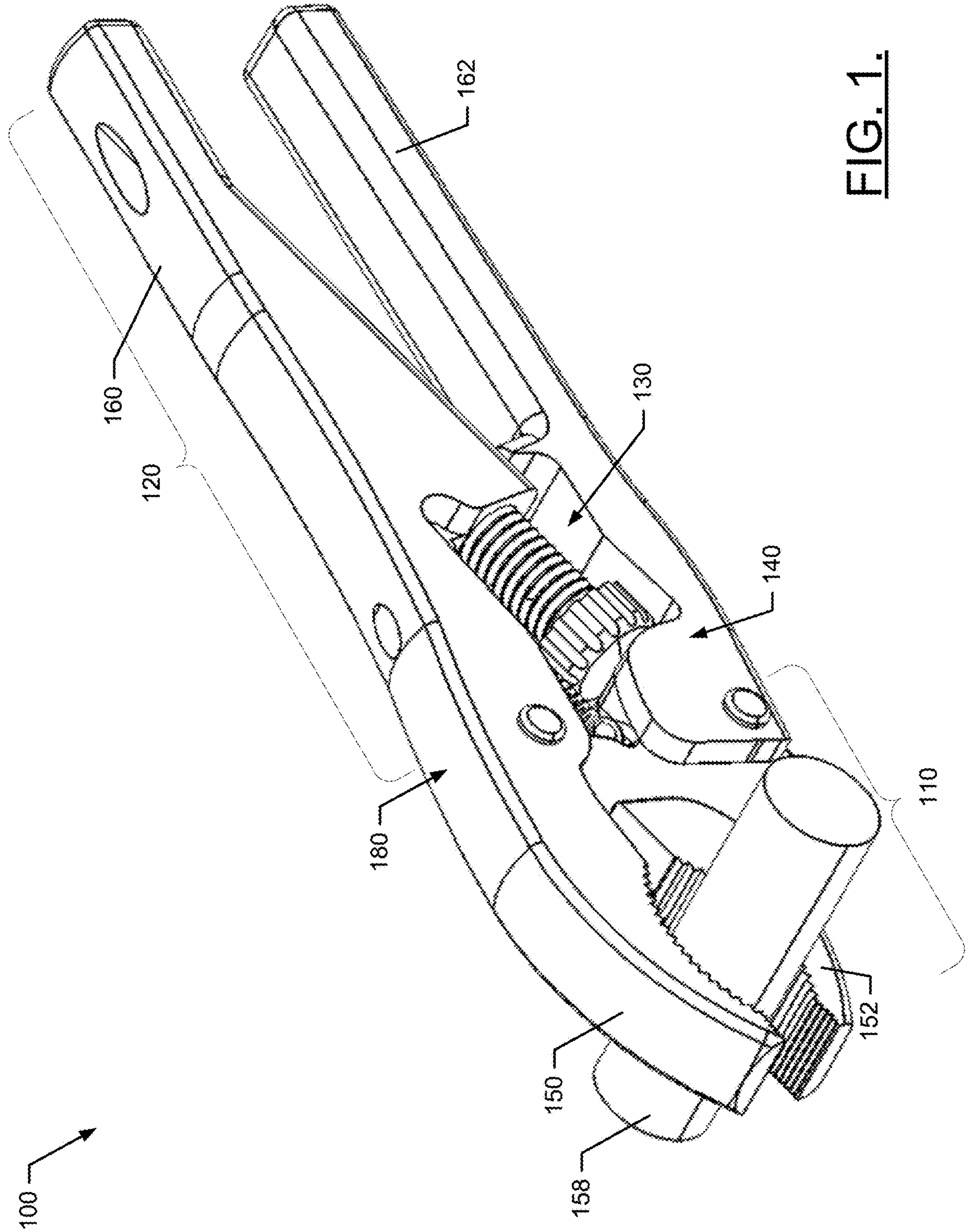
FIG. 1 illustrates a perspective view of a hand tool with an improved adjustment assembly according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term “or” is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a locking pliers that can be adjusted with the same hand that is applying a grip to the handles of the pliers. FIGS. 1-5 show various views or portions of one example of a locking pliers capable of grasping media while still being easily adjustable.

In this regard, FIG. 1 illustrates a perspective view of a locking pliers 100 of an example embodiment poised to grip a pipe or other media in accordance with an example embodiment. Meanwhile, FIGS. 2 and 3 each illustrate side views of the locking pliers 100 in a closed (or locked) and open (or unlocked) position, respectively. FIG. 4 illustrates an exploded view of the locking pliers 100, and FIG. 5 specifically highlights a cam lock disposed at the bottom handle of the locking pliers 100.

Referring now to FIGS. 1-5, the locking pliers 100 may include a jaw assembly 110 at a first end thereof, and a handle assembly 120 at a second end thereof. An adjustment assembly 130 may be integrated into the handle assembly 120, along with a clamping assembly 140. Moreover, the clamping assembly 140 and the adjustment assembly 130 may be configured to share components between the respective assemblies.

The jaw assembly 110 may include a top jaw 150 and a bottom jaw 152 that are configured to face each other with at least one of the top jaw 150 or bottom jaw 152 being movable relative to the other in order to define open and closed positions as defined in greater detail below. Although not required, the top jaw 150 may include an arcuate shaped grip portion 154 that extends from a distal end of the top jaw 150 (relative to the handle assembly 120) toward the handle assembly 120. The grip portion 154 may include transversely extending teeth of similar or different sizes relative to one another. The bottom jaw 152 may also include an arcuate shaped grip portion 156 that extends from a distal end of the bottom jaw 152 (relative to the handle assembly 120). The grip portion 156 may also include transversely extending teeth of similar or different sizes relative to one another (and to the teeth of the grip portion 154 of the top jaw 150). In some cases, the distal ends of the grip portions 154 and 156 may not be arcuate, and may instead be substantially parallel to each other when in the jaw assembly 110 is in the closed position. Media 158 may be placed between the top jaw 150 and bottom jaw 152, and the media 154 may be gripped by the grip portions 154 and 146 via operation of the handle assembly 120.

The handle assembly 120 may include a top handle 160 and a bottom handle 162. The top handle 160 and the top jaw 150 of this example embodiment may be formed from the same unitary piece of metal. However, the bottom jaw 152 and the bottom handle 162 may be made of different pieces of metal that are operably coupled together (e.g., pivotally connected to each other). The bottom jaw 152 may therefore be connected to the bottom handle 162 via a first pivot link 170. The first pivot link 170 may extend laterally through receiving openings 172 formed at a portion of the bottom handle 162, and a first aligned pivot opening 174 formed in the bottom jaw 152. The bottom jaw 152 may also be pivotally connected to the top handle 160 (and/or top jaw 150) via a second pivot link 176 that extends laterally through receiving openings 178 formed in a transition region 180 at which the top jaw 150 and an aligned second pivot opening 179 formed in the bottom jaw 152.

The first and second pivot links 170 and 176 may each define respective pivot points or pivot axes about which the bottom jaw 152 and the bottom handle 162 may pivot relative to each other and to the top jaw 150 and top handle 160. In this regard, for example, the bottom jaw 152 may pivot about the first pivot link 170 to change a distance between distal ends of the top and bottom jaws 150 and 152, and between the respective grip portions 154 and 156 of the top and bottom jaws 150 and 152, respectively. Thus, the bottom jaw 152 pivots about the first pivot link 170 to define a range of motion that extends between a fully open position (where the distal ends and the respective grip portions 154 and 156 of the top and bottom jaws 150 and 152 are farthest apart from each other) and a fully closed position (where the distal ends of the top and bottom jaws 150 and 152 meet each other).

Figure 2:
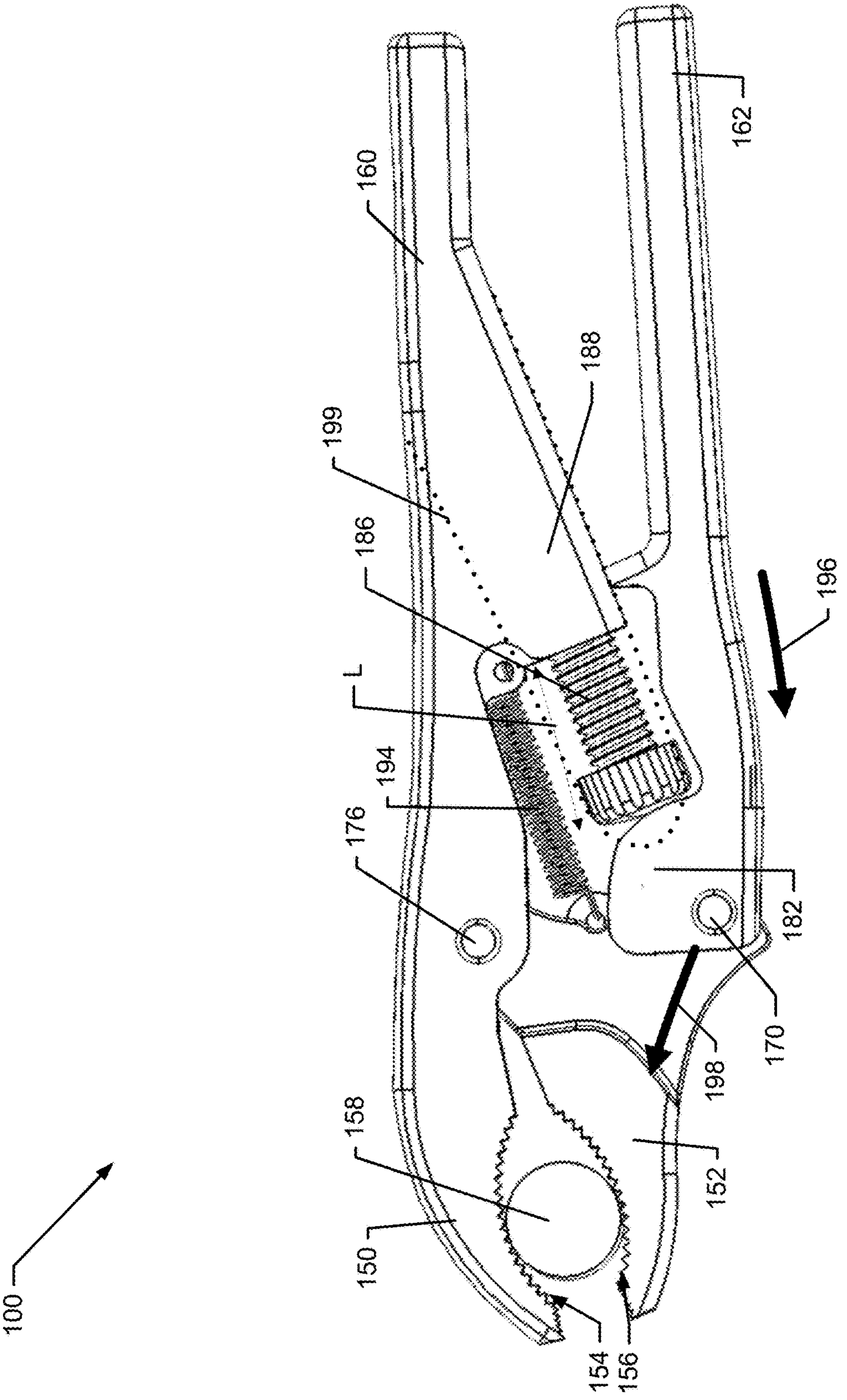
FIG. 2 is a side view of the hand tool of FIG. 1 in a closed position in accordance with an example embodiment.
Figure 3:
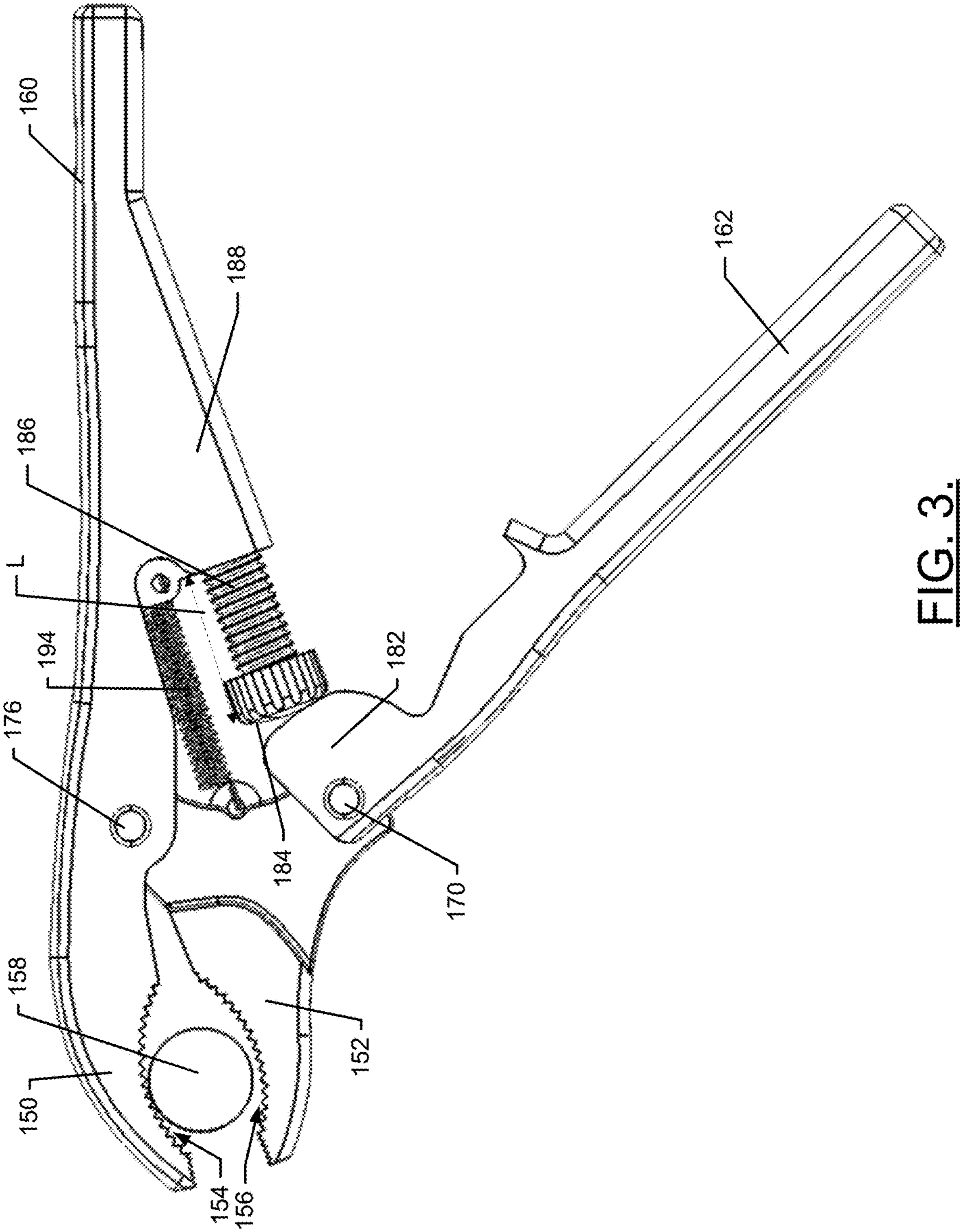
FIG. 3 is side view of the hand tool of FIG. 1 in an open position in accordance with an example embodiment.
Figure 4:
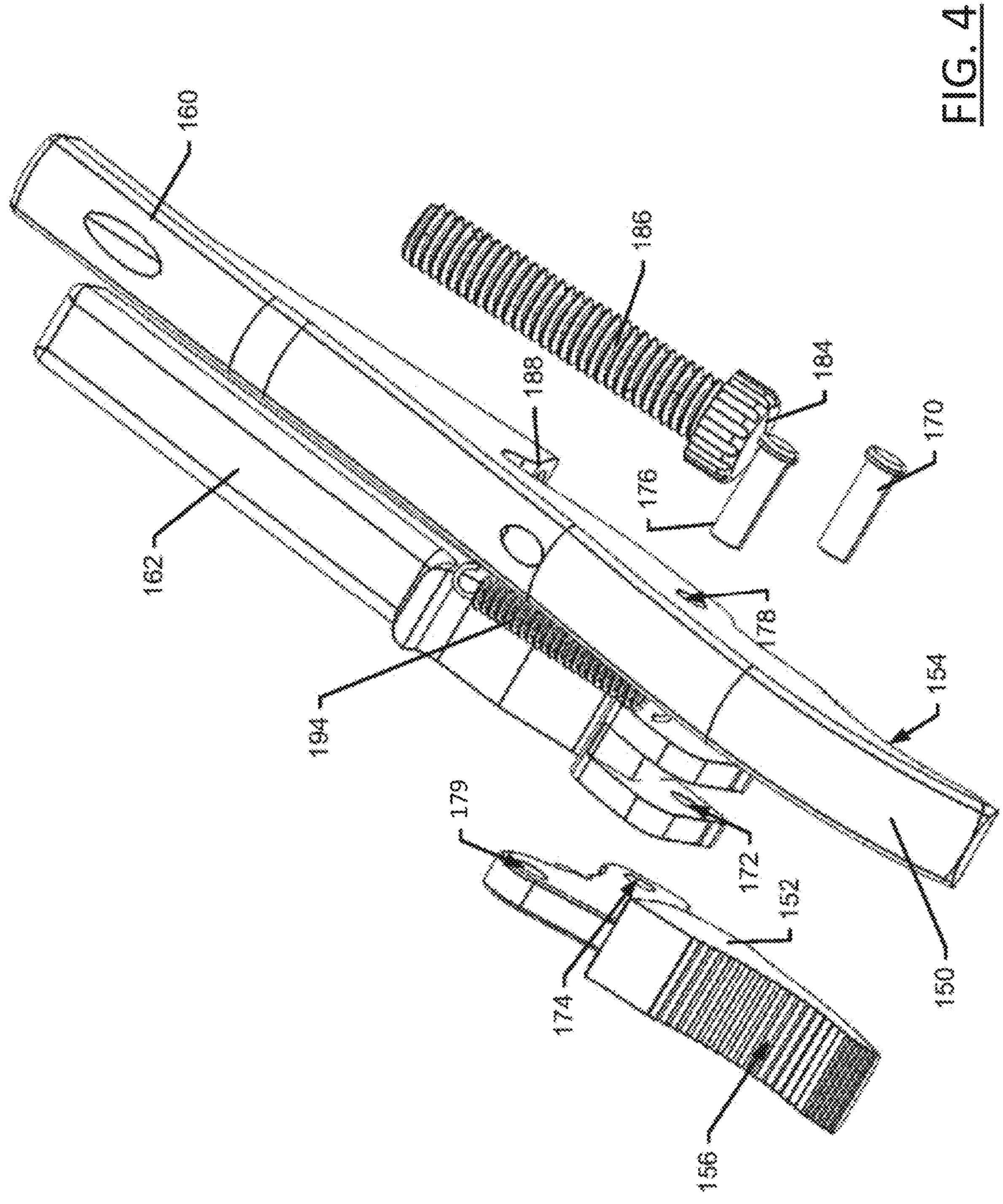
FIG. 4 is a exploded perspective view of the hand tool in accordance with an example embodiment.

The bottom jaw 152 and the bottom handle 162 may pivot relative to each other about the second pivot link 176 in order to transition between a closed position (or locked position) shown in FIG. 2 and an open position (or unlocked position) shown in FIG. 3. Moreover, the transition between locked and unlocked positions may involve passing through a clamping apex (or a balance point) for the clamping assembly 140.

The clamping assembly 140 may operate to lock the top jaw 150 and bottom jaw 152 in a relationship relative to one another. The locking of the top jaw 150 relative to the bottom jaw 152 may occur when the distal ends of the top jaw 150 is locked a fixed distance from the bottom jaw 152 when the handle assembly 120 is in the closed position shown in FIGS. 1 and 2. In an example embodiment, the clamping assembly 140 may include a cam lock 182 disposed at a proximal end of the bottom handle 152, and a camming surface 184 of adjuster 186. Notably, adjuster 186 also forms part of the adjustment assembly 130 along with threaded receiver 188, which is integrated into the top handle 160.

The threaded receiver 188 is configured to receive the adjuster 186 (which is embodied as a threaded screw in this example) by threaded connection therebetween. The adjuster 186 may therefore be screwed into the threaded receiver 188 to define an exposed length (L) of the adjuster 186. In this regard, for example, by screwing the adjuster 186 farther into the threaded receiver 188, the exposed length (L) is shortened, and by unscrewing the adjuster 186 farther out of the threaded receiver 188, the exposed length (L) is lengthened. The threaded receiver 188 is formed at a relatively small angle (e.g., less than 30 degrees) relative to the longitudinal centerline of the top handle 160, and extends generally away from the distal end of the top handle 160 (and toward the proximal end of the bottom handle 162).

Figure 5:
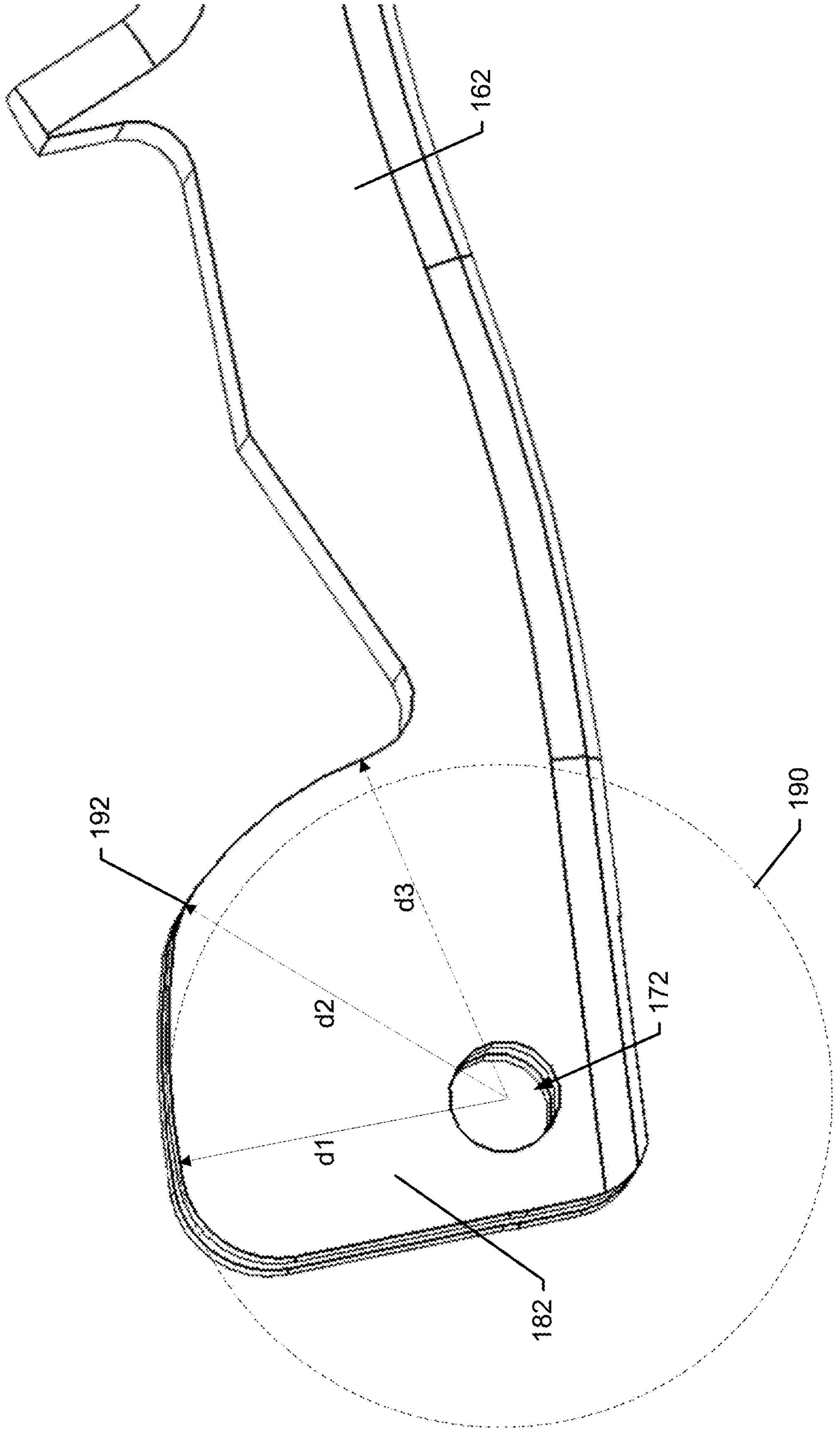
FIG. 5 is a side view of a cam lock of the hand tool in accordance with an example embodiment.

As shown in FIG. 5, the cam lock 182 is formed at the proximal end of the bottom handle 162, and on a side of the bottom handle 162 that faces toward the top handle 160. Thus, the cam lock 182 extends from the receiving openings 172 (and therefore the first pivot link 170) toward the top handle 160 forming an arcuate shaped peripheral edge that defines a cam shape for the cam lock 182. Using an axial center of the receiving openings 172 as a point of reference, it can be seen that a distance from the axial center of the receiving openings 172 to a point on a periphery of the cam lock 182 that is substantially perpendicularly displaced from the axial center relative to the longitudinal centerline of the bottom handle 162 defines a distance (or length) that is labeled d1. The distance d1 may form the radius of a reference circle 190 having its center at the axial center of the receiving openings 172. Meanwhile, extending along the periphery of the cam lock 182 in a direction toward the distal end of the bottom handle 162 (i.e., away from the proximal end), the distance from the axial center to the periphery of the cam lock 182 increases to a maximum length of distance d2. The point on the periphery of the cam lock 182 that defines the maximum distance d2 may be referred to as the balance point 192. After passing the balance point 192, the distance from the axial center to the periphery of the cam lock 182 then begins to decrease and stays relatively steady at distance d3. As can be appreciated from FIG. 5 by comparing d1, d2 and d3 to the reference circle 190, d1<d3<d2. However, one of skill in the art will appreciate that alternative embodiments could be employed that have d2=d3. Moreover, in some cases, d3 may actually be slightly larger than d2.

During operation, the camming surface 184 of the adjuster 186 abuts the periphery of the cam lock 182 (e.g., on the arcuate surface forming the periphery of the cam lock 182). By gripping the top and bottom handles 160 and 162, and applying a closing force thereto, the locking pliers 100 is transitioned from the condition shown in FIG. 3 (i.e., the open position) to the condition shown in FIG. 2 (i.e., the closed position). During such transition, the camming surface 184 rides along the periphery of the cam lock 182 from contact with (or near) the point on the periphery of the cam lock 182 that is substantially perpendicularly displaced from the axial center relative to the longitudinal centerline of the bottom handle 162 (i.e., defined by d1) toward the balance point 192. After passing the balance point 192, the camming surface 184 comes to a rest when the handle assembly 120 is in the closed position (shown in FIG. 2) at a point on the cam lock 182 corresponding to d3.

When the handle assembly 120 is in the closed position, the distance between the top jaw 150 and the bottom jaw 152 is fixed. Moreover, since d3 is greater than d1, the bottom jaw 152 pivots about the second pivot link 176 slightly to draw the top and bottom jaws 150 and 152 slightly closer to each other at the fixed distance than was the case prior to moving to the closed position. A biasing member (e.g., spring 194) may also be provided to extend from the top handle 160 to a point on the bottom jaw 152 to bias the bottom jaw 152 open. The spring force generated by spring 194 is overcome during the transition past the balance point 192. Otherwise, the spring 194 may draw the bottom jaw 152 toward the top handle 160 regardless of the position of the adjuster 186.

The magnitude of the distance between the top jaw 150 and the bottom jaw 152 when the handle assembly 120 is in the closed position is adjustable by changing the exposed length (L) of the adjuster 186. In this regard, by extending the length of the adjuster 186 (i.e., increasing the exposed length (L)) as shown by arrow 196, the first pivot link 170 is correspondingly moved forward (e.g., in the direction of arrow 198). The distance between the top jaw 150 and bottom jaw 152 in the locked position is therefore determined by the exposed length (L) of the adjuster 186 and is increased by shortening the exposed length (L) or decreased by lengthening the exposed length (L).

As can be appreciated from the example of FIGS. 1-5, example embodiments may define a hand tool with an improved capability for grasping media and adjusting the bite size of the jaws with the gripping hand. In this regard, an outline 199 of the thumb of an operator gripping the hand tool 100 is shown in FIG. 2, and the thumb is placed naturally alongside the adjuster 186 to permit such adjustment. As such, the hand tool of an example embodiment may include a handle assembly, a jaw assembly, a clamping assembly, and an adjustment assembly. The handle assembly includes a first handle and a second handle that each include a proximal end and a distal end. The jaw assembly includes a first jaw and a second jaw. The jaw assembly is operably coupled to the proximal end of the first and second handles. The clamping assembly may be configured to enable the first and second jaws to be locked at a selected distance from each other in a locked position. The adjustment assembly may be configured to enable the selected distance to be modified. The adjustment assembly may be disposed between the first and second handles.

The hand tool and/or its components may include a number of modifications, augmentations, or optional additions, some of which are described herein. The modifications, augmentations or optional additions may be added in any desirable combination. For example, the clamping assembly may be disposed between the first and second handles as well. In an example embodiment, the adjustment assembly may be disposed proximate the jaw assembly. In some cases, the clamping assembly may be disposed proximate the jaw assembly. In an example embodiment, the second handle and the second jaw may be operably coupled at a first pivot link. The first handle and the second jaw may be operably coupled at a second pivot link, and gripping the handle assembly may shift the handle assembly to a closed position, and correspondingly via pivoting of the second jaw about both the first and second pivot links shift the jaw assembly to the locked position. In some cases, the clamping assembly may include a cam lock disposed at the proximal end of the second handle, and a camming surface disposed at a distal end of an adjuster configured to extend from the first handle toward the proximal end of the second handle. A periphery of the cam lock may define an arcuate surface having respective different distances from a first pivot link connecting the second jaw to the second handle and defining a pivot point about which the second jaw and second handle pivot relative to each other. In an example embodiment, a balance point may be defined along the arcuate surface. The balance point may define a largest distance from an axis of the first pivot link along the arcuate surface. The camming surface may engage a first portion of the cam lock on a first side of the balance point, where the first portion is disposed a first distance from the axis of the first pivot link when the handle assembly is in an opened position. The camming surface may also engage a second portion of the cam lock on a second side of the balance point, where the second portion is disposed a second distance from the axis of the first pivot link when the handle assembly is in a closed position. The first distance may be less than the second distance. In some cases, the adjustment assembly may include an adjuster configured to interface with a threaded receiver to enable an operator to extend and shorten an exposed length of the adjuster based on an amount of the adjuster that is received in the threaded receiver. The threaded receiver may extend from the first handle at an angle relative to a longitudinal centerline of the first handle, and the camming surface may be disposed on a distal end of the adjuster. In an example embodiment, extending the exposed length of the adjuster urges the first pivot link away from the distal end of the first handle via contact between the camming surface and the cam lock, and shortening the exposed length of the adjuster draws the first pivot link toward to distal end of the first handle. In some cases, the first handle and the first jaw are portions of a single unitary metallic member, such that the first jaw is a fixed jaw, and the second jaw is a movable jaw relative to the first jaw. A second pivot link may be disposed at a transition portion between the first jaw and the first handle. In an example embodiment, the second handle may be biased to pivot away from the first handle about the first pivot link. In some cases, a spring may extend between the first handle and the second jaw to bias the second handle to pivot away from the first handle. In an example embodiment, the hand tool may be a locking pliers, and the first handle may be a top handle and the first jaw may be a top jaw, while the second handle is a bottom handle and the second jaw is a bottom jaw.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand tool comprising:

a handle assembly comprising a first handle and a second handle, each of the first and second handles having a proximal end and a distal end;

a jaw assembly comprising a first jaw and a second jaw, the jaw assembly being operably coupled to the proximal end of the first and second handles;

a clamping assembly configured to enable the first and second jaws to be locked at a selected distance from each other in a locked position; and an adjustment assembly configured to enable the selected distance to be modified, wherein the adjustment assembly is disposed between the first and second handles, wherein the clamping assembly comprises a cam lock disposed at the proximal end of the second handle, and a camming surface disposed at a distal end of an adjuster configured to extend from the first handle toward the proximal end of the second handle, wherein a periphery of the cam lock defines an arcuate surface having respective different distances from a first pivot link connecting the second jaw to the second handle and defining a pivot point about which the second jaw and second handle pivot relative to each other, wherein a balance point is defined along the arcuate surface, the balance point defining a largest distance from an axis of the first pivot link along the arcuate surface, wherein the camming surface engages a first portion of the cam lock on a first side of the balance point, the first portion being disposed a first radial distance from the axis of the first pivot link when the handle assembly is in an opened position, wherein the camming surface engages a second portion of the cam lock on a second side of the balance point, the second portion being disposed a second radial distance from the axis of the first pivot link when the handle assembly is in a closed position, and wherein the first radial distance is less than the second radial distance.

2. The hand tool of claim 1, wherein the clamping assembly is disposed between the first and second handles.

3. The hand tool of claim 1, wherein the adjustment assembly is disposed proximate the jaw assembly.

4. The hand tool of claim 3, wherein the clamping assembly is disposed proximate the jaw assembly.

5. The hand tool of claim 1, wherein the second handle and the second jaw are operably coupled at a first pivot link, wherein the first handle and the second jaw are operably coupled at a second pivot link, and wherein gripping the handle assembly shifts the handle assembly to a closed position, and correspondingly via pivoting of the second jaw about both the first and second pivot links shifts the jaw assembly to the locked position.

6. The hand tool of claim 1, wherein the adjuster is configured to interface with a threaded receiver to enable an operator to extend and shorten an exposed length of the adjuster based on an amount of the adjuster that is received in the threaded receiver, wherein the threaded receiver is integrated into the first handle such that threads of the threaded receiver are disposed on the first handle at an angle relative to a longitudinal centerline of the first handle, and wherein the camming surface is disposed on a distal end of the adjuster.

7. The hand tool of claim 6, wherein extending the exposed length of the adjuster urges the first pivot link away from the distal end of the first handle via contact between the camming surface and the cam lock, and shortening the exposed length of the adjuster draws the first pivot link toward to distal end of the first handle.

8. The hand tool of claim 6, wherein the first handle and the first jaw are portions of a single unitary metallic member, such that the first jaw is a fixed jaw, and the second jaw is a movable jaw relative to the first jaw, and wherein a second pivot link is disposed at a transition portion between the first jaw and the first handle.

9. The hand tool of claim 6, wherein the second handle is biased to pivot away from the first handle about the first pivot link.

10. The hand tool of claim 9, wherein a spring extends between the first handle and the second jaw to bias the second handle to pivot away from the first handle.

11. The hand tool of claim 1, wherein the hand tool comprises a locking pliers, wherein the first handle is a top handle and the first jaw is a top jaw, and wherein the second handle is a bottom handle and the second jaw is a bottom jaw.

12. An adjustment assembly for adjusting an adjustable locking pliers having a handle assembly and a jaw assembly, the adjustment assembly comprising:

an adjuster disposed between a top handle and a bottom handle of the handle assembly;

a threaded receiver; and a cam lock, wherein the adjuster is configured to interface with the threaded receiver to enable extending or shortening an exposed length of the adjuster based on an amount of the adjuster that is received in the threaded receiver, wherein the adjuster is further configured to interface with a portion of the bottom handle of the handle assembly to define a selected distance between a top jaw and a bottom jaw of the jaw assembly when the locking pliers are in a locked position, wherein a bite size between jaws of the jaw assembly is determined based on the exposed length of the adjuster, wherein the periphery of the cam lock defines an arcuate surface having respective different radial distances from a first pivot link connecting the bottom jaw to the bottom handle and defining a pivot point about which the bottom jaw and bottom handle pivot relative to each other, wherein a balance point is defined along the arcuate surface, the balance point defining a largest distance from an axis of the first pivot link along the arcuate surface, wherein the camming surface engages a first portion of the cam lock on a first side of the balance point, the first portion being disposed a first radial distance from the axis of the first pivot link when the handle assembly is in an opened position, wherein the camming surface engages a second portion of the cam lock on a second side of the balance point, the second portion being disposed a second radial distance from the axis of the first pivot link when the handle assembly is in a closed position, and wherein the first radial distance is less than the second radial distance.

13. The adjustment assembly of claim 12, wherein the threaded receiver extends from the top handle at an angle relative to a longitudinal centerline of the top handle, and wherein a camming surface is disposed at a distal end of the adjuster to interface with a periphery of the cam lock disposed at the bottom handle to transition the handle assembly to the locked position.

14. The adjustment assembly of claim 12, wherein the top handle and the top jaw are portions of a single unitary metallic member, such that the top jaw is a fixed jaw, and the bottom jaw is a movable jaw relative to the top jaw, and wherein a second pivot link is disposed at a transition portion between the top jaw and the top handle to operably couple the bottom jaw to the top handle.

15. The adjustment assembly of claim 14, wherein the bottom handle is biased to pivot away from the top handle about the first pivot link.

16. The adjustment assembly of claim 15, wherein a spring extends between the top handle and the bottom jaw to bias the bottom handle to pivot away from the top handle.

* * * * *